United States Patent [19]

Bullock

[11] 3,816,877
[45] June 18, 1974

[54] SHRIMP CLEANING MACHINE
[75] Inventor: Kenneth W. Bullock, Seattle, Wash.
[73] Assignee: Marine Construction & Design Co., Seattle, Wash.
[22] Filed: Nov. 3, 1971
[21] Appl. No.: 195,192

[52] U.S. Cl. ................................................. 17/73
[51] Int. Cl. ........................................... A22c 29/00
[58] Field of Search ...................... 17/53, 71, 72, 73

[56] References Cited
UNITED STATES PATENTS
2,794,209  6/1957  Self.......................................... 17/71

*Primary Examiner*—Louis G. Mancene
*Assistant Examiner*—D. L. Weinhold
*Attorney, Agent, or Firm*—Christensen, O'Connor, Garrison & Havelka

[57] ABSTRACT

A machine and method for cleaning marine life such as shrimp by passing the shrimp down between spaced peeling rolls having a vertically reciprocating plate therebetween with the rolls on movable centers positioned as a function of the plate shape and position with the plate having shaped sides with a traveling belt moving over the top edge of the plate for carrying away the cleaned shrimp and the rolls having an outer surface of a predetermined hardness and material and rotating at a predetermined speed with the plate vertically reciprocating at a predetermined speed and a spray provided for cleaning the rolls and plate and forcing uncleaned shrimp into the nips between the rolls and plate.

20 Claims, 9 Drawing Figures

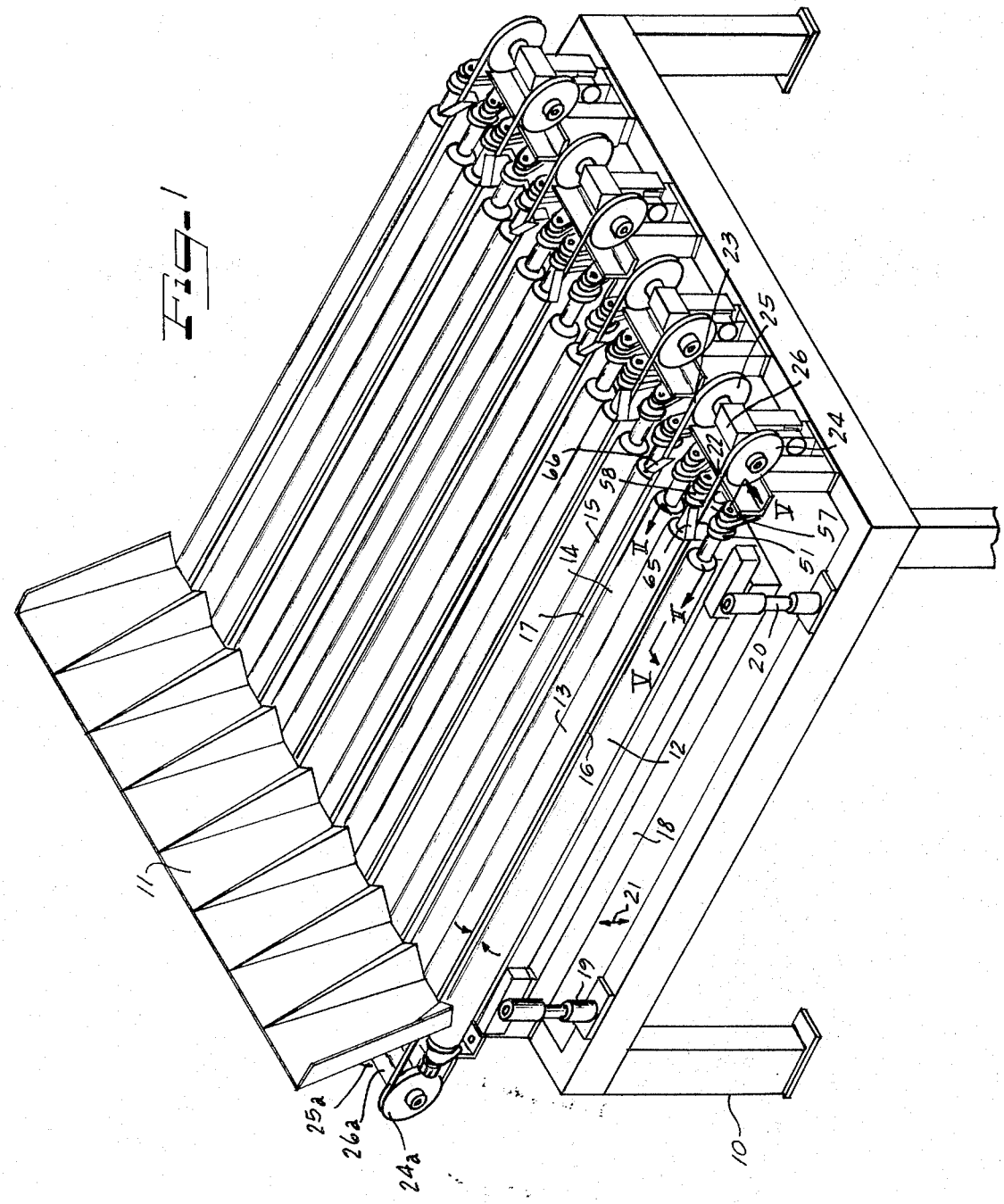

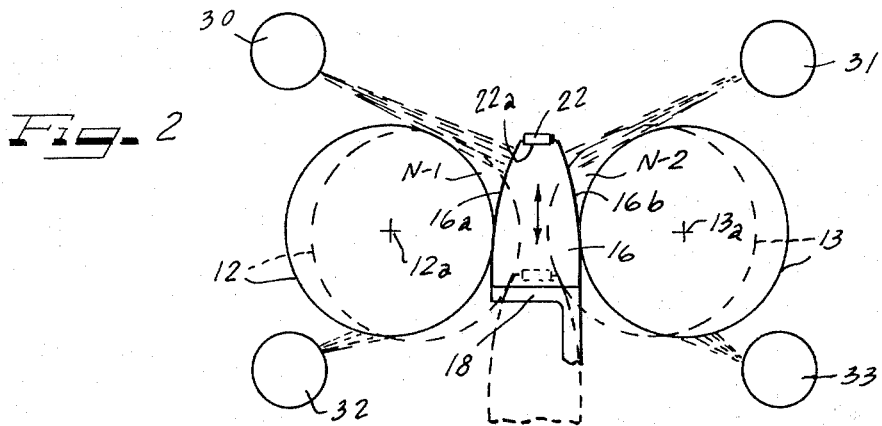
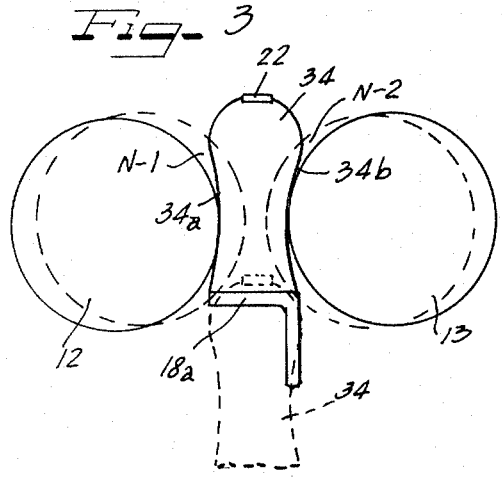
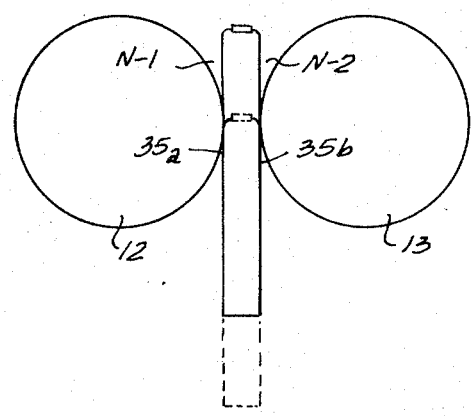
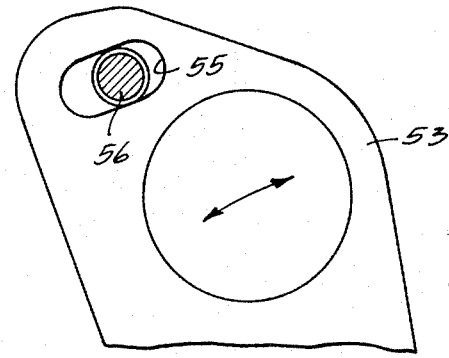

SHRIMP CLEANING MACHINE

BACKGROUND OF THE INVENTION

The invention relates to an improved machine and method for cleaning shell covered marine life such as shrimp and having improved capabilities for better cleaning with less damage to the meat of the shrimp and having capabilities of cleaning precooked shrimp at commercial speed.

More particularly, the invention contemplates the provision of a shrimp cleaning machine embodying a pair of parallel rolls rotating toward each other with a vertically reciprocating plate therebetween with the plate having straight or curved sides. The nip angle does not change for the vertical position of the plate unless the sides of the plate have a compound or involute radius. The rolls are on movable centers and their positions are controlled as a function of the position and shape of the plate so that a constant spacing is maintained between the rolls and the plate, and the plate and rolls and belt traveling over the top of the plate are each driven at predetermined controllable speeds for achieving improved cleaning.

In the removal of shells from marine life such as shrimp, optimum cleaning is obtained manually wherein the shells are removed without damage to the meats. However, for commercial operation manual cleaning has become too slow and too expensive and machines for the cleaning of shrimp have encountered disadvantages in incomplete cleaning, damage to the meats, incapability of handling shrimps of different sizes and incapability of handling variation in shrimp characteristics such as when the shrimp are precooked.

It is an object of the present invention to provide an improved machine and method for the removal of shells and foreign material from all types of shrimp having different cleaning characteristics wherein the machine is capable of operating at commercial speeds.

A feature of the invention is the utilization of the inherent physical characteristics of the shrimp body and shell to the advantage of the cleaning process in order to effect a more complete and uniform removal of the inedible and objectionable portions of the shrimp including the shell. The effect of hand cleaning of the shrimp utilizes the fingers for manually pinching, pulling and sliding for dislodging of the shell and separation of the shell from the meat. Transportation of the meat from the shell is accomplished automatically by pulling the units apart. However, in manual cleaning the cleaner automatically compensates for different characteristics in resiliency of the meat, hardness of the shell and resistance to separation. These changes and difficulties have not been compensated for in machines heretofore available for shrimp cleaning. In the instant invention the machine has physical characteristics and variables which make it possible to compensate for all variations in the resistance of shrimp to being cleaned, and it has been found that it is impossible to predict in advance the operation of related machine parts insofar as how they will affect the shrimp. I have discovered that the unique relationship of the parts of my machine avoids difficulties encountered by machines heretofore available and achieves an improved cleaning action having greater flexibility and dexterity.

As has been discovered, the shrimp as a whole is a heterogeneous structure including a body, a neck, a mid-section and tail meat with meat cavity components, with a shell and with appendages, feelers, pinchers and legs. Their cross-sections are small as compared with other parts of the shrimp, and this is taken advantage of by being easily engaged by the machine components. The shell is of a dense material, stiff in comparison with the other parts, and possesses limited elastomeric properties of flexibility. The degree of resiliency due to the curvature is slight and the elastic modulus is very low, and it does not take too much force to overcome this resiliency. The head shell is only slightly resilient due to its shape, and the application of force easily flattens it. The inner soft mushy components add little or nothing to the resiliency of the shell structure and once flattened they remain squashed. The body meats differ markedly from the preceding components in that they have inner elastomeric properties and in addition to flexibility have inherent synergistic response to deformation and a higher elastic modulus making them more elastic. Precooked shrimp are less elastomeric than raw. Precooking breaks down tissue holding meat to the shell and at the same time makes the meat firmer and more subject to damage from frictional action. This is one of the reasons for a wider nip angle. The surface of the body meat is smooth and moist and the addition of water tends to reduce the coefficient of friction of the body and meat surface with the machine surfaces and increases the natural differences in values of coefficient of the smooth meat and shell. The shell also has a degree of roughness, nicks, barbs and sharp edges. In the application of frictional forces in the process of cleaning of shrimp, the stresses produce strains including tension in shell segment joints to cause parting, tension on neck gristle to cause separation, shear in interface of shell and body meat to cause loosening, shear in sliding the loosening shell from the body meat, compression on the head to cause squashing and pressure on the appendages including the feelers, legs, tail flippers and so forth, and compression of the shell and appendages to force them into a space, but at the same time not accommodating the body meat. Once separated, the properties of the body meat are utilized and the meats are conveyed out of the machine separated from the continuing separating action of the machine parts.

It is accordingly an object of the present invention to provide a marine life cleaning machine for removing the shells from shrimp and the like which has the capability of applying a separating force to remove the shell from the meat and then position the meat automatically on a conveyor away from the action of the separating elements for conveying it out of the machine.

Another object of the invention is to provide a machine wherein the parts have unique relative movement for a separating action and where the effects of this separating action can be individually controlled to thereby control the relative functions between the parts to accommodate differences in characteristics emulating the effect of manual cleaning which automatically compensates for such differences in characteristics.

A still further object of the invention is to provide an improved mechanical shrimp cleaning structure which performs the cleaning operation in a single pass through a machine and requires less space and weight and equipment than structures heretofore available.

DESCRIPTION OF THE DRAWINGS

FIG. 1 is a somewhat schematic perspective view of a machine constructed and operating in accordance with the principles of the present invention;

FIG. 2 is an end elevational view taken substantially along the line II—II of FIG. 1 showing the relative shape and position of certain parts;

FIGS. 3 and 4 are end elevational views similar to FIG. 2 showing alternative shapes of the dividing plate;

FIG. 6 is a fragmentary sectional view taken substantially along line VI—VI of FIG. 5 with parts omitted for clarity;

DESCRIPTION OF THE PREFERRED EMBODIMENTS

Figure 5:
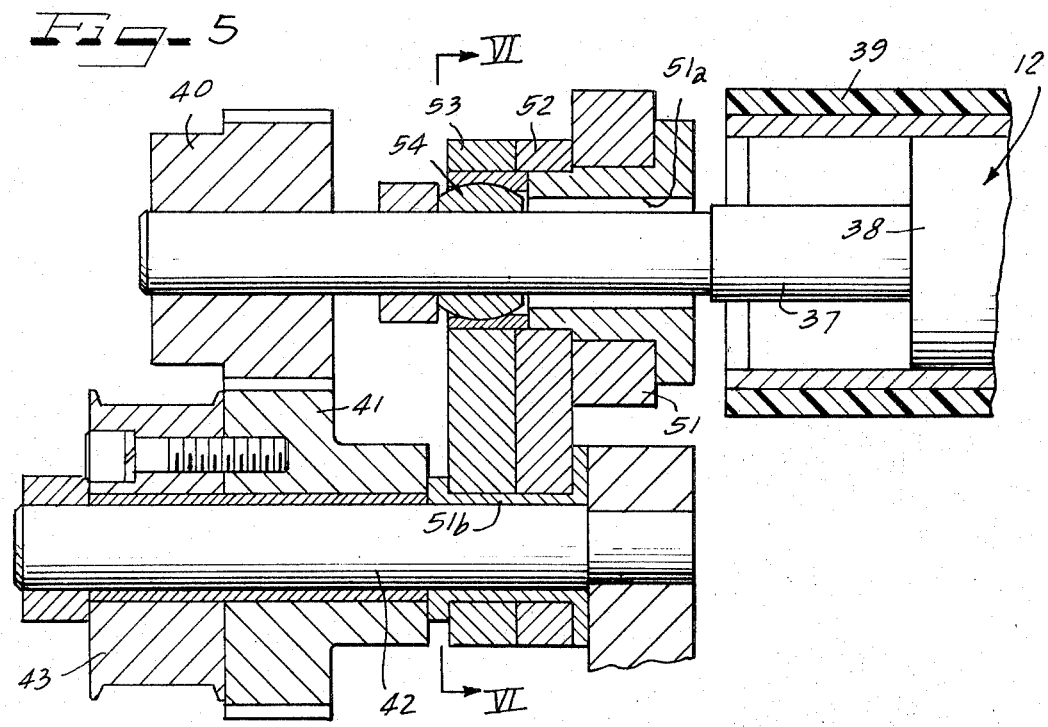
FIG. 5 is a vertical sectional view taken substantially along line V—V of FIG. 1.

The machine is shown supported on a main frame 10 for mounting on a table or a shop floor. Uncleaned marine life, such a precooked shrimp, are dumped into the machine at the feed end where there is located a shield 11 to aid in directing the shrimp into the cleaning troughs between the pairs of rolls. The shrimp is carried from the left end to the right end of the machine as it is pictured in FIG. 1 and during its travel, the shells and other foreign matter are cleaned with the finished shrimp being delivered off the end of the machine on the righthand end.

The rolls are horizontal and are arranged in pairs or sets with one pair being shown by the rolls 12 and 13 and the next adjacent pair by the rolls 14 and 15. A plurality of similar sets of rolls are located across the width of the entire machine, and each set is substantially identical in structure and operation so only the above referred to sets need be further described.

The rolls extend horizontally and parallel to each other and are supported on axes which are movable toward or away from each other with respect to each pair of rolls as will be described below. Between each pair of rolls is a vertically reciprocating divider plate such as the plate 16 between the rolls 12 and 13 and the plate 17 between the rolls 14 and 15. The plates are mounted on a vertically reciprocating frame 18 having positioning guides 19 and 20. A suitable drive mechanism is provided for vertical reciprocation of the plates shown schematically at 21, and a crank and pitman drive may be employed, or a mechanism such as a controlled reciprocating hydraulic cylinder and piston may be used for the plate drive.

Each of the plates such as 16 and 17 is removably mounted on the frame 18 so that plates of different shapes may be substituted. FIGS. 2, 3 and 4 illustrate some shapes of plates which may be used. The rolls are rotatably mounted and rotate in a direction with their top surfaces moving toward the plates. Each side of the plate thus forms a peeling nip with the roll and as the shrimps are caught in the peeling nip, the combined action of the vertically reciprocating plate and the traveling roll surface performs the cleaning function. When the shell and debris have been removed, the meat of the shrimps tends to move over onto the center of the plate where it is carried along toward the discharge end of the machine on a traveling belt. A belt 22 is shown traveling the top of plate 16, and a belt 23 is provided for the plate 17.

The speed of rotation of the rolls 12 and 13 is controllable, the speed of vertical reciprocation of the plate 16 is controlled, and the speed of travel of the conveying belt 22 is controllable. Each of these speeds may be regulated independently of the other for optimum performance. The size of the shrimp will vary considerably from very small Alaskan shrimp to larger Gulf shrimp, so that the speed variables will accommodate the different physical characteristics of the different shrimp. Another variable factor is the shape of the center plate.

As illustrated in FIG. 2, the center plate 16 reciprocates vertically from an uppermost position, shown in the solid line position of FIG. 2, to a lowermost position, shown in the dotted line position of FIG. 2. In the lowermost position the traveling belt 22 is below the center lines 12a and 13a of the peeling rolls 12 and 13, and this facilitates easy movement of peeled shrimp onto this moving belt. The rolls are operated so that their position changes during vertical reciprocation of plate 16 and the rolls will follow the side surfaces 16a and 16b of the plate so as to maintain a constant spacing relative to the plate surfaces 16a and 16b. This spacing is adjustable in accordance with the type of shrimp handled from the position of the rolls where the rolls are maintained in contact with the side surfaces of the plate to a position where they are separated. As will be later described in connection with FIGS. 5 and 6, the range of roll positions can be adjusted from the contact position to a separation of as much as three-eighths inch.

The upper edge of the plate may be recessed slightly to provide a path for the traveling belt 22 which rests on the recessed surface 22a. As the rolls rotate and the plate reciprocates, the shells of the shrimp are caught in the cleaning nips N-1 and N-2 until the shells are removed and passed downwardly between the rolls and plate. The remaining resilient shrimp meat, once it is rid of the shell, tends to center itself on the plate when the plate is in its lowermost position and will be carried on the surface of the belt 22. Sprays 30 and 31 are positioned to direct sprays of water in a lateral direction across the conveyor belt so as to tend to knock any uncleaned shrimp off the conveyor belt. The cleaned shrimp being relatively smooth and small will either stay on the belt or if not, will roll back onto the belt when the plate is in its lower position. These sprays can be arranged for the full length of the plate or may be arranged to extend for only a portion of the length of the plate and rolls. The sprays are fixed so as to engage the shrimp only as the plate is approximately in its intermediate position.

Additional sprays 32 and 33 are positioned beneath the rolls 12 and 13 to direct a tangential cleaning spray of water against the rolls and remove any particles which may tend to adhere to the lower surface of the rolls. These particles are flushed downwardly with the water to drop into a suitable container beneath the machine. Also, the shells and other debris cleaned from the shrimp will tend to pass between the sides of the plate and the rolls. The resiliency of the rolls accommodates the shells and other debris. The resilient mounting of the rolls accommodates a fixed relationship of the rolls to irregularly shaped plates.

In FIG. 3 a plate 34 is positioned between rolls 12 and 13 with the plate having sides 34a and 34b of compound curvature.

In the structure of FIG. 2, the plate 16 has its sides of convex curvature. This increases the nip angle over a flat plate.

It is also possible to employ a plate with a compound radius. With this arrangement as the plate descends, the angle of the nips N-1 and N-2 increases or decreases depending on the curvature. This changing nip angle enhances the cleaning effect between the plate sides and surfaces of the rolls 12 and 13.

For harder shelled shrimp it has been discovered that a smaller nip angle is advantageous, and a plate such as 34 of FIG. 3 with concave sides 34a and 34b is employed. This structure maintains a smaller angle for a longer period of travel of the plate. The upper portions of the sides of the plate are shown to be convex so that in the overall travel of the plate, a greater variation of this angle is obtained presenting a fairly broad nip angle to the shrimp toward the lower portion of plate travel. A large nip angle is used for easier to peel Alaska shrimp. A small angle is desirable for harder to peel varieties.

In the arrangement of FIG. 4, a flat center plate 35 is used with planar vertical sides 35a and 35b. This plate will maintain a uniform angle for the nips N-1 and N-2 during the full period of travel of the plate. As will be seen, with changes in the type of shrimp being processed, the center plates can be quickly exchanged to provide plates of optimum shape for the type of shrimp being cleaned. Also, if experience shows that the characteristics of shrimp are changing for different batches, as may be represented by different catches from shrimp boats, a plate of optimum configuration can be substituted to increase the effectiveness of cleaning and increase the speed of operation of the machine. Other factors can, of course, be varied and as the speed of cleaning increases with changes of plates, the speed of the conveyor belt 22 may be increased to convey away the cleaned shrimp at a faster rate.

To improve the frictional action between the shells of the shrimp and the rolls 12 and 13, they are covered with a material of a predetermined hardness. Polyurethane material has been found to have an optimum characteristic for engagement with the shrimp shells providing the proper elasticity and wearing qualities. A roll surface having hardness in the range of 20 durometer shore A scale to 75 durometer shore D scale is preferred. FIG. 5 shows the roll 12 having a center supporting shaft 37 with an enlarged portion 38 supporting the polyurethane covering. A shaft 37 and roll 38 of stainless steel are desired for cleanliness and absence of contamination of the shrimp.

Figure 8:
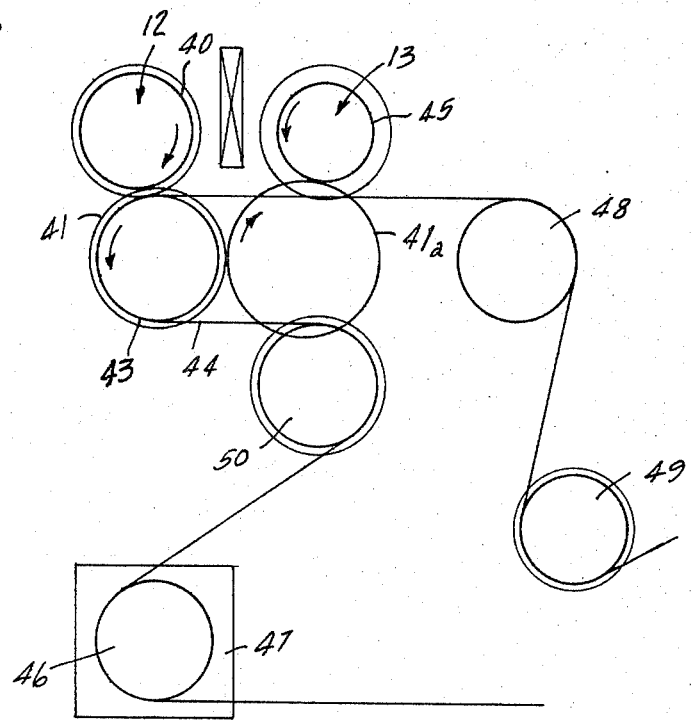
FIG. 8 is a somewhat schematic end elevational view showing the drive for the peeling rolls.

The roll is driven by a gear 40 on the shaft which is meshed with a drive gear 41 supported on a stub shaft 42. The drive gear 41 is driven by a gear belt pulley 43 which is driven in a manner shown in FIG. 8. The gear belt pulley has a timing belt looped thereover which passes over a tensioning idler pulley 50 and is looped over a drive pulley 46 driven by a variable speed controllable hydraulic or other powered motor 47. In this manner the speed of the rolls can be controlled. The timing belt 44 is arranged so that it drives the next set of rolls by passing over a drive gear belt pulley 48 and is wrapped therearound by an idler pulley 49. The roll 12 is driven by the mesh between its gear 40 with its drive gear 41, and the roll 13 is similarly driven by a gear 41a driven by the drive gear 41, and being meshed with a roll gear 45 on the shaft for the roll 13. Various other forms of driving connection may be employed which operate the pairs of rolls at the same speed which permit controlling the surface speeds of the rolls.

The position of the roll 12 is at all times controlled by a positioning roller 51 which rolls against a positioning cam 57. The positioning cam 57 moves up and down with the plate 16, and its location is shown in FIG. 1. The roll 12 has a positioning roller 51, and the roll 13 has a positioning roller 58. These rollers are biased against the positioning cam 57 so that as the cam 57 moves up and down with the plate, the peeling rolls 12 and 13 move together or apart as determined by the shape of the positioning cam 57.

For the purposes of permitting movement of the peeling rollers 12 and 13 together or apart, they are supported on pivotal arms at their ends, with the pivotal arms for the roll 12 being shown at 52 and 53 in FIG. 5. The support for each of the rolls 12 and 13 is the same so that it need be explained in detail only in connection with FIG. 12.

The pivotal arms 52 and 53 are pivotally supported on a hub 51b on the shaft 42. The positioning roll 51 is rotatably carried on the pivotal arm 52 and it has an enlarged center bore 51a therethrough to permit it to be shifted laterally with respect to the axis of the roll shaft 37. The arm 52 is locked in an adjusted position to the arm 53 in which the roll shaft 31 is rotatably mounted.

As shown in FIG. 6, each of the pivotal arms 52 and 53 have a slot 55 therethrough, and a bolt 56 extending through the slots will lock the arms 52 and 53 together in adjusted position.

Thus, with the positioning roll 51 engaging its cam 57, the bolt 56 of FIG. 6 is loosened and the roll 12 is moved toward or away from the center plate 16 until the proper nip opening is obtained. The bolt 56 is then tightened to lock the two plates 52 and 53 together, and thereafter as the positioning roll 51 is pushed by the cam 57, the roll 12 will be controlled in its lateral position. The roll 12 on its shaft 37 rotates on a bearing 54 in the arm 53.

While the cam 57 is preferably shaped so as to have a contour identical to the shape of the center plates such as 16 and 34, FIGS. 2 and 3, variations in shapes may be used so that the size of the nips will change at different vertical positions of the center plates. With a straight sided plate such as 35, FIG. 4, a cam 57 with straight sides will preferably be chosen. Of course, if a cam 57 with varying sides is chosen, the rolls 12 and 13 will move toward or away from the plate as the plate reciprocates vertically.

Figure 9:
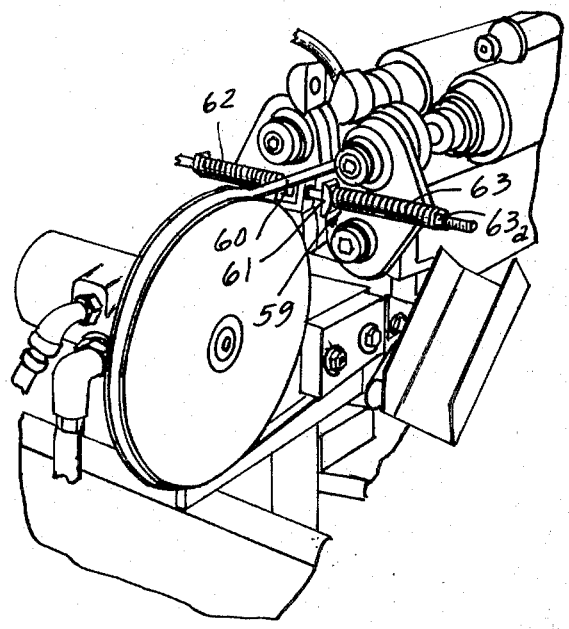
FIG. 9 is a perspective view illustrating additional features of the biasing arrangement for the position of the rolls.

For urging the rolls 12 and 13 toward the plate, and holding the positioning rollers 51 and 58 against the side surfaces of the cam 57, a spring assembly 59 is provided as shown in FIG. 9. This spring assembly has coil compression springs 62 and 63 which slide on a rod 63a and push inwardly on lugs 60 and 61 to urge the peeling rollers inwardly. The springs are adjustable to control the pressure in the nip between the rolls and plate. The springs hold the positioning rolls 51 and 58 against the positioning cam 57, which moves up and down with the divider plate 16.

As above mentioned, the divider plates are interchangeable for obtaining different plate contours for shrimp of different characteristics and they also may be interchangeable to provide plates with sides of different coefficients of friction. Preferably divider plates of polished stainless steel are used, but the frictional properties of the sides of the plate may be varied by the degree of polishing or machining. The plates may be mounted on an angle iron support 18a, as shown in FIGS. 2 and 3 and suitable securing means provided such as bolts extending upwardly through the top flange of the angle iron into the base of the plate 16. The angle irons are mounted on the bed 18 which is driven in vertical reciprocation.

As shown in FIG. 1, at the discharge end of the machine, at the righthand side of the drawing, short discharge guide plates 65 and 66 are provided to deflect the shrimp meats off of the belt 22 and 23 when they arrive at the discharge end of the machine. The shrimps will then fall down into a container, not shown. These guide plates are mounted on the ends of the divider plates 16 and 17 to remain in a constant position relative to the belts.

Figure 7:
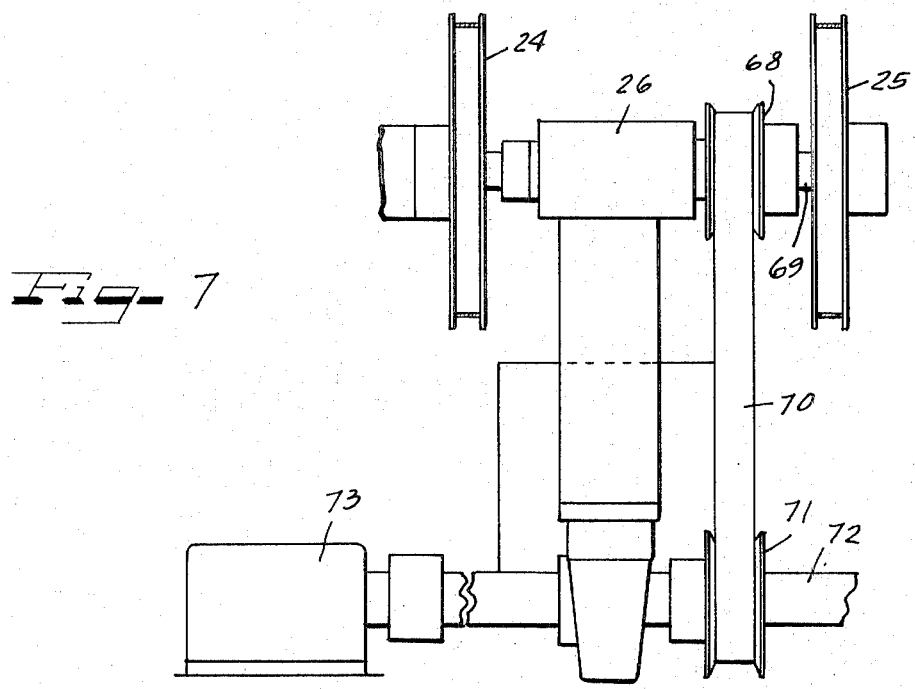
FIG. 7 is a fragmentary elevational view showing features of the drive for the conveyor belts.

The belts and their supports are constructed for ease of changing and replacement. For this purpose, the belt sheaves 24 and 25 at one end and 24a and 25a at the other end are mounted so that they can be withdrawn outwardly of the center sheave support 26 and 26a. As shown in FIGS. 1 and 7, the belts have sufficient elasticity that they can be lifted off of the sheaves and moved outwardly to be slid upwardly around the outermost roll. For example, belt 23 is removed off the sheave 25 and lifted upwardly between the rolls 13 and 14. In this manner the belts can be replaced without disassembling other parts of the machine.

As shown in FIG. 7, the belts are driven by a pulley 68 mounted on the shaft 69 which supports the sheaves 24 and 25. The pulley 68 is a gear pulley driven by gear belt 70 which in turn is driven by a driving pulley 71 mounted on the through drive shaft 72, (which is omitted from the illustration of FIG. 1), but extends fully across the discharge end of the machine and is provided with a separate pulley for each pair of drive belts. The shaft 72 is driven by a variable speed hydraulic motor 73 so that the speed of the belts can be controlled for optimum delivery of peeled shrimp. This speed can be varied by the operator watching the operation of the machine so that the peeled shrimp are carried off as soon as they are cleaned, and a chart can be provided for the operator so that proper belt speed is used for different speeds of the rollers and plates so that an inexperienced operator can obtain good performance. The range of speed of the hydraulic motor should be provided that the belts can travel between 20 to 70 feet per minute with 30 to 50 being more close to the range of usual operation.

In operation the shrimp are dumped on the delivery end of the machine against the guide plate 11 and passed down into the valleys between the pairs of rolls. As the divider plates 16 and 17 move up and down and the peeling rolls 12, 13, 14 and 15 move toward the plates, the coaction of the side surface of the plate and the roll surfaces pulls the shell off the shrimp as the plate is moving down. When the plate reaches the maximum lower position of its down stroke, the shrimp rolls onto the traveling belt and moves endwise on the belt during a portion of the upstroke. As the plate moves upwardly, the shrimp tends to fall off the top edge of the plate back into the nip, and this is aided by the action of the sprays 30 and 31. If the shrimp is firmly caught in the peeling nip, the upstroke will tend to disgorge the shell or tentacle or part of the shrimp that is caught in the nip. When the shell is peeled from the meat of the shrimp, the slippery shrimp body will not catch in the nip and will either tend to stay on the belt or float in the nip on the downstroke of the plate without being caught and move onto the belt at the lowermost position of the plate. The shells and debris from the shrimp will pass through the nips down below the machine. Adjustment of the nip width, i.e., the distance between the roller and the plate will help accommodate shrimps of different sizes and shell and debris of different thicknesses and characteristics, and the cam 57 for each pair of rollers is chosen to match the divider plate and a nip width is chosen which experience has shown to be optimum for the type of shrimp processed. Variations occur in shrimp size from Alaskan shrimp and West Coast shrimp which are relatively small, to Florida and Gulf shrimp which are considerably larger and shrimp size is conveniently referred to by a reference number which indicates the number of shrimp per pound. Also, for any shrimp obtained from any location, the size may vary and the cleaning characteristics may vary, and the present machine is particularly well adapted for ease of adjustment of operation factors to accommodate these variations in characteristics. As above stated, the dividing plate profile, the speed of vertical reciprocation and height of vertical reciprocation are all adjustable. Also, the speed of rotation of the peeling rolls and the speed of travel of the belt are variable. The type and hardness of covering of the rolls is another variable which can be effected by changing rolls. The speed of belt travel and other factors may have to be changed with each change in speed or characteristic of another part of the machine and experience and visual inspection will enable the operator to make these changes for consistent good performance.

I claim as my invention:
1. A machine for removing shells from marine life comprising in combination,
    an elongate generally horizontally extending roll,
    means for driving the roll in rotation,
    a generally horizontally extending divider plate positioned adjacent the roll and having a cleaning side surface facing the downrunning roll surface forming an upwardly facing cleaning nip therewith,
    and means for moving the plate in a cyclical vertical movement for cleaning shells from marine life in the nip,
        said plate cleaning surface having a non-planar surface in a vertical direction.
2. A machine for removing shells from marine life constructed in accordance with claim 1 wherein said plate side surface is convex.

3. A machine for removing shells from marine life constructed in accordance with claim 1 wherein said plate side surface is concave.

4. A machine for removing shells from marine life constructed in accordance with claim 1 wherein the side surface of said plate has a concave lower portion and a convex upper portion so that as the plate moves downwardly relative to the roll, the nip angle first decreases and then increases for improved cleaning action.

5. A machine for removing shells from marine life constructed in accordance with claim 1 and including means for maintaining the roll at a controlled variable lateral position relative to the plate surface at all vertical positions of the plate.

6. A machine for removing shells from marine life comprising in combination,
an elongate generally horizontally extending cleaning roll,
means for driving the roll in rotation,
a generally horizontally extending divider plate positioned adjacent the roll and having a cleaning side surface facing the downrunning roll surface forming a cleaning nip therewith,
means for moving the plate in a cyclical vertical movement for cleaning shells from marine life in the nip,
and means maintaining the roll at a controlled variable lateral position relative to the plate surface as the plate moves vertically.

7. A machine for removing shells from marine life constructed in accordance with claim 6 wherein said roll maintaining means includes a spring biasing the roll inwardly toward said plate.

8. A machine for removing shells from marine life constructed in accordance with claim 6 wherein the axis of said roll is supported on a movable bearing carried on a pivotal mount supporting the roll for movement about an arc passing substantially normal to the plate surface and includes means biasing the roll toward the plate.

9. A machine for removing shells from marine life constructed in accordance with claim 1 with said plate having a second cleaning side surface on the opposite side of the plate,
a second elongate generally horizontally extending roll in nip forming relationship with said second surface of the plate,
means driving the roll in rotation with the downrunning side moving toward the second side of the plate,
said surfaces curved in a vertical direction,
said rolls being supported on movable mounts for being positioned in a predetermined position relative to the sides of said plate as the plate moves vertically.

10. A machine for removing shells from marine life constructed in accordance with claim 1 and including a releasable mount for said plate so that different plates having different characteristics can be substituted for marine life having different cleaning characteristics.

11. A machine for removing shells from marine life comprising in combination,
an elongate generally horizontally extending roll,
means for driving the roll in rotation,
a generally horizontally extending divider plate positioned adjacent the roll and having a cleaning side surface facing the downrunning roll surface forming an upwardly facing cleaning nip therewith,
and means for moving the plate in a cyclical vertical movement for cleaning shells from marine life in the nip,
said roll having a resilient surface with a hardness in the range of 20 durometer shore A to 75 durometer shore D.

12. A machine for removing shells from marine life constructed in accordance with claim 11 wherein said roll has a surface formed of polyurethane.

13. A machine for removing shells from marine life constructed in accordance with claim 1 wherein said moving means for said plate has a variable speed control having a speed range of at least from 40 to 160 vertical movements per minute.

14. A machine for removing shells from marine life constructed in accordance with claim 1 wherein said driving means for said roll has a variable speed control and has a speed range of at least 20 to 120 feet per minute roll surface movement.

15. A machine for removing shells from marine life constructed in accordance with claim 1 and including a traveling conveyor means moving linearly along the top edge of the plate from one end of the plate toward the other to transport cleaned marine life along the plate.

16. A machine for removing shells from marine life constructed in accordance with claim 15 wherein said conveyor means is in the form of a looped belt having an upper run supported on the upper edge of the plate.

17. A machine for removing shells from marine life comprising in combination,
an elongate generally horizontally extending cleaning roll,
means for driving the roll in rotation,
a generally horizontally extending divider plate positioned adjacent the roll and having a cleaning side surface facing the downrunning roll surface forming a cleaning nip therewith,
means for moving the plate in a cyclical vertical movement for cleaning shells from marine life in the nip,
said plate having a second cleaning side surface on the opposite side of the plate,
a second cleaning roll in nip forming relationship with the second surface,
means driving the roll in rotation with the downrunning side moving toward the second side of the plate,
and a traveling conveyor belt having an upper run supported on the top edge of the plate for conveying cleaned marine life along the plate.

18. A machine for removing shells from marine life constructed in accordance with claim 17 and including pulley supports for the belt means mounted to move vertically with said plate.

19. A machine for removing shells from marine life constructed in accordance with claim 17 and including a drive for the belt having a variable speed control means controlling the belt speed in a range extending from at least 20 to 70 feet per minute.

20. A machine for removing shells from marine life constructed in accordance with claim 17 and including spray means positioned laterally of the plate extending for a portion of the plate length at the end of the rolls where cleaning is begun directing a spray of liquid at the marine life on the belt to force it off the belt into the nips.

* * * * *